(12) United States Patent
Kwon et al.

(10) Patent No.: US 8,064,327 B2
(45) Date of Patent: Nov. 22, 2011

(54) ADAPTIVE DATA MULTIPLEXING METHOD IN OFDMA SYSTEM AND TRANSMISSION/RECEPTION APPARATUS THEREOF

(75) Inventors: Hwan-Joon Kwon, Hwaseong-si (KR); Joon-Young Cho, Suwon-si (KR); Yun-Ok Cho, Suwon-si (KR); Ju-Ho Lee, Suwon-si (KR); Dong-Hee Kim, Yongin-si (KR); Jin-Kyu Han, Seoul (KR); Achim Seebens, Nordrhein-Westfalen (DE); Peter Jung, Nordrhein-Westfalen (DE); Tobias Scholand, Nordrhein-Westfalen (DE)

(73) Assignee: Samsung Electronics Co., Ltd., Suwon-si (KR)

( * ) Notice: Subject to any disclaimer, the term of this patent is extended or adjusted under 35 U.S.C. 154(b) by 1328 days.

(21) Appl. No.: 11/417,218

(22) Filed: May 4, 2006

(65) Prior Publication Data

US 2007/0064664 A1    Mar. 22, 2007

(30) Foreign Application Priority Data

May 4, 2005   (KR) .................. 10-2005-0037776
Feb. 2, 2006  (KR) .................. 10-2006-0010072

(51) Int. Cl.
*H04J 11/00* (2006.01)
(52) U.S. Cl. ........................ 370/208; 370/343
(58) Field of Classification Search .................. 370/208, 370/343, 281, 480; 455/447, 436; 709/229
See application file for complete search history.

(56) References Cited

U.S. PATENT DOCUMENTS

| 6,714,561 | B1 * | 3/2004 | Park et al. .................. 370/469 |
| 6,862,618 | B1 | 3/2005 | Gray et al. |
| 7,251,768 | B2 * | 7/2007 | Giannakis et al. .......... 714/755 |
| 7,391,715 | B2 * | 6/2008 | Lee et al. .................... 370/208 |
| 2002/0181390 | A1 * | 12/2002 | Mody et al. ................. 370/208 |
| 2004/0001429 | A1 * | 1/2004 | Ma et al. .................... 370/210 |
| 2004/0062212 | A1 * | 4/2004 | Mandyam .................. 370/281 |
| 2004/0235472 | A1 * | 11/2004 | Fujishima et al. ........... 455/434 |
| 2005/0025040 | A1 | 2/2005 | Tang et al. |
| 2005/0128935 | A1 * | 6/2005 | Tang et al. ................. 370/208 |
| 2005/0220200 | A1 * | 10/2005 | Giannakis et al. .......... 375/260 |
| 2006/0014542 | A1 * | 1/2006 | Khandekar et al. ......... 455/447 |
| 2007/0253496 | A1 * | 11/2007 | Giannakis et al. .......... 375/260 |

FOREIGN PATENT DOCUMENTS

| CA | 2351140 A1 | 3/2002 |
| CN | 1 354 571 A | 6/2002 |
| CN | 11 354 571 A | 6/2002 |

(Continued)

*Primary Examiner* — Ricky Ngo
*Assistant Examiner* — David Oveissi
(74) *Attorney, Agent, or Firm* — Roylance, Abrams, Berdo & Goodman, LLP

(57) ABSTRACT

A transmission/reception method and apparatus in an Orthogonal Frequency Division Multiplexing (OFDM)-based wireless communication system are provided, in which a data transmitter adaptively selects a multiplexing scheme according to a code rate of the transmission packet or an effective SNR of a wireless channel for a corresponding terminal, when transmitting a packet data channel. The adaptive multiplexing scheme is equal in concept to a scheme of adaptively implementing unitary precoding. The unitary precoded multiplexing includes Orthogonal Frequency code Domain Multiplexing (OFCDM), Fast Fourier Transform-Spread-OFDM (FFT-S-OFDM), Fast Frequency Hopping-OFDM (FFH-OFDM), and the like. The method and apparatus adaptively selects the multiplexing scheme and transmits/receives data using the selected multiplexing scheme, thereby improving reception performance of the packet data.

7 Claims, 13 Drawing Sheets

FOREIGN PATENT DOCUMENTS

| | | |
|---|---|---|
| CN | 1437825 A | 8/2003 |
| KR | 2003-0005897 | 1/2003 |
| KR | 2004-0074015 | 8/2004 |
| RU | 2166236 | 4/2001 |
| WO | WO 02/100048 | 12/2002 |
| WO | WO 2003/103330 A1 | 12/2003 |

* cited by examiner

ADAPTIVE DATA MULTIPLEXING METHOD IN OFDMA SYSTEM AND TRANSMISSION/RECEPTION APPARATUS THEREOF

CROSS-REFERENCE TO RELATED PATENT APPLICATIONS

This application claims the benefit under 35 U.S.C. §119 (a) of Korean Patent Applications filed in the Korean Intellectual Property Office on May 4, 2005 and assigned Serial No. 2005-37776, and filed in the Korean Intellectual Property Office on Feb. 2, 2006 and assigned Serial No. 2006-10072, the entire disclosure of both of which are hereby incorporated by reference.

BACKGROUND OF THE INVENTION

1. Field of the Invention

The present invention relates generally to a communication system using a multiple access scheme. More particularly, the present invention relates to a transmission/reception method and apparatus for selecting an optimal multiplexing scheme according to data transmission conditions and transmitting data using the selected multiplexing scheme to improve reception performance of data transmitted in a system that transmits/receives data using an Orthogonal Frequency Division Multiplexing (OFDM)-based multiple access scheme.

2. Description of the Related Art

Recently, in the field of wireless communication systems, active research is being conducted on Orthogonal Frequency Division Multiplexing (OFDM), which is useful for high-speed data transmission over wireless channels. OFDM, a scheme for transmitting data using multiple carriers, is a kind of Multi-Carrier Modulation that converts a serial input symbol stream into parallel symbols and modulates each of the symbols with a plurality of orthogonal sub-carriers, such as, sub-carrier channels, before transmission.

FIG. 1 is a block diagram illustrating a structure of a transmitter for a general OFDM system.

Referring to FIG. 1, the transmitter for the general OFDM system includes a channel encoder 101, modulator 102, serial-to-parallel (S/P) converter 103, Inverse Fast Fourier Transform (IFFT) unit 104, parallel-to-serial (P/S) converter 105, and cyclic prefix (CP) inserter 106.

The channel encoder 101 performs channel encoding on an input information bit stream. Generally, a convolutional encoder, turbo encoder, or low density parity check (LDPC) encoder is used as the channel encoder 101.

The modulator 102 performs quaternary phase shift keying (QPSK), 8 phase shifting key (PSK), or 16 quadrature amplitude modulation (QAM) on the output of the channel encoder 101. Although not illustrated in FIG. 1, it would be obvious to those skilled in the art that a rate matching unit for performing repetition and puncturing functions can be added between the elements 101 and 102.

The S/P converter 103 has a function for converting the signal output from the modulator 102 into a parallel signal. The IFFT unit 104 performs IFFT calculation on the output of the S/P converter 103.

The P/S converter 105 converts the output of the IFFT unit 104 back into a serial signal. The CP inserter 106 has a function for attaching a cyclic prefix (CP) to the output signal of the P/S converter 105.

There is a modified OFDM multiplexing scheme in which a transmitter performs Hadamard transform on modulation symbols in a frequency domain before transmission. This scheme is generally called Multi-Carrier Code Domain Multiplexing (MC-CDM) or Orthogonal Frequency Code Domain Multiplexing (OFCDM).

FIG. 2 is a block diagram illustrating a structure of a general Unitary Precoded OFDM transmitter.

Referring to FIG. 2, the general Unitary Precoded OFDM transmitter includes a channel encoder 201, modulator 202, unitary precoder 203, S/P converter 204, Inverse Fast Fourier Transform (IFFT) unit 205, P/S converter 206 and CP inserter 207.

The channel encoder 201 performs channel encoding on an input information bit stream. Generally, a convolutional encoder, turbo encoder, or LDPC encoder is used as the channel encoder 201.

The modulator 202 performs QPSK, 8PSK, or 16QAM modulation on the output of the channel encoder 201. Although not illustrated in FIG. 2, it would be obvious to those skilled in the art that a rate matching unit for performing repetition and puncturing functions can be added between the elements 201 and 202.

The unitary precoder 203 is a common unitary precoder, and various examples of unitary precoding will be described later with reference to FIGS. 3A to 3C.

The S/P converter 204 has a function of converting the output of the modulator 202 into a parallel signal. The IFFT unit 205 performs IFFT calculation on the output of the S/P converter 204.

The P/S converter 206 converts the output of the IFFT unit 205 back into a serial signal. The CP inserter 207 has a function of attaching a CP to the output signal of the P/S converter 206.

FIGS. 3A to 3C are diagrams illustrating multiple examples of the unitary precoder of FIG. 2. FIG. 3A is a diagram illustrating a unitary precoder in which Hadamard transform is used.

Referring to FIG. 3A, the unitary precoder includes a symbol demultiplexer (DEMUX) 311, a Walsh function covering unit 312, and a Walsh summer 313.

The symbol DEMUX 311 converts the serial signal output from the modulator 202 of FIG. 2 into a parallel signal. The Walsh function covering unit 312 performs a process of Walsh-covering or spreading each of modulation symbols output from the symbol DEMUX 311 by a Walsh code with a predetermined length. The Walsh summer 313 performs a process of summing up the outputs (that is, outputs spread by each Walsh function) of the Walsh function covering unit 312.

FIG. 3B is a diagram illustrating a unitary precoder in which Fast Fourier Transform (FFT) is used.

Referring to FIG. 3B, the unitary precoder includes a symbol DEMUX 321, an FFT unit 322, and a P/S converter 323.

The symbol DEMUX 321 converts the serial signal output from the modulator 202 of FIG. 2 into a parallel signal. The FFT unit 322 performs FFT transform on the output of the symbol DEMUX 321. The P/S converter 323 converts the parallel signal output from the FFT unit 322 into a serial signal.

FIG. 3C is a diagram illustrating a unitary precoder in which Fast Frequency Hopping (FFH) is used.

Referring to FIG. 3C, the unitary precoder includes a symbol DEMUX 331, an FFH linear processor 332, and a P/S converter 333.

The symbol DEMUX 331 converts the serial signal output from the modulator 202 of FIG. 2 into a parallel signal. The FFH linear processor 332 performs FFH liner transform on the output of the symbol DEMUX 331. The FFH is a technology for mapping different sub-carriers every OFDM sample. The P/S converter 333 converts the parallel signal output from the FFH linear processor 332 into a serial signal.

Of the foregoing conventional Unitary Precoded OFDM multiplexing schemes, the Hadamard precoded OFDM scheme of FIG. 3A will be referred to as an Orthogonal Frequency Code Division Multiplexing (OFCDM) scheme, and the FFT precoded OFDM of FIG. 3B will be referred to as an FFT Spread OFDM (FFT-S-OFDM) scheme. In addition, the FFH precoded OFDM scheme of FIG. 3C will be referred to as a Fast Frequency Hopping-OFDM (FFH-OFDM) scheme.

FIG. 4 is a diagram of a brief description of a concept of the general FFH introduced in FIG. 3A.

Referring to FIG. 4, a description will be made of a FFH technique by comparing the existing frequency hopping technique with the FFH technique for one OFDM symbol time for an FFT size of M=4.

In FIG. 4, reference numeral 401 denotes a multi-carrier modulation apparatus for performing the existing per-symbol frequency hopping technique for a 4-OFDM sample time. Reference numerals 405 to 408 denote FFH multi-carrier modulation apparatuses.

In the existing frequency hopping technique shown in the left of FIG. 4, input data is identical for a 4-OFDM sample time and output signals are output one by one every sample time. Because the existing frequency hopping technique maps fixed sub-carriers in a one-OFDM symbol time, the blocks denoted by reference numerals 401 to 404 are identical for a 4-OFDM sample time.

However, in the FFH technique shown in the right of FIG. 4, mapping between sub-channel data and actual sub-carriers is changed by an M:M switch every sample time. Sub-carriers to which a first sub-channel denoted by reference numeral 405 is mapped are mapped in order of [1 4 2 3], sub-carriers to which a second sub-channel denoted by reference numeral 406 is mapped are mapped in order of [4 3 1 2], sub-carriers to which a third sub-channel denoted by reference numeral 407 is mapped are mapped in order of [2 1 3 4], and sub-carriers to which a fourth sub-channel denoted by reference numeral 408 is mapped are mapped in order of [3 2 4 1]. This mapping pattern is called a hopping pattern for each sub-channel.

As described above, compared with the Unitary Precoded OFDM technology, the OFDM technology shows higher performance at a low code rate. However, compared with the OFDM technology, the Unitary Precoded OFDM technology exhibits higher performance at a very high code rate, such as, a 4/5 code rate. Despite these characteristics, the common mobile communication system undesirably uses one of the OFDM and Unitary Precoded OFDM technologies for the packet data transport channels.

Accordingly, there is a need for an improved adaptive data multiplexing method in an OFDMA system and transmission/reception apparatus that uses OFDM and unitary precoded OFDM technologies.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a transmission/reception method and apparatus for adaptively utilizing both of, not only one of, the OFDM and Unitary Precoded OFDM technologies according to circumstances to improve reception performance in transmitting/receiving packet data in an OFDM-based wireless communication system.

According to one aspect of exemplary embodiments of the present invention, there is provided an adaptive data multiplexing transmission method in a base station for an orthogonal frequency division multiple access (OFDMA) system in which a terminal performs packet communication in coverage of a base station, the base station transmits packet data to the terminal, information is collected necessary for scheduling, scheduling is performed using the collected information, a code rate of data to be transmitted is compared to a selected terminal with a predetermined threshold, a proper multiplexing scheme is selected according to the comparison result, and packet data is transmitted using the selected multiplexing scheme.

According to another aspect of exemplary embodiments of the present invention, there is provided an adaptive data multiplexing transmission method in a base station for an orthogonal frequency division multiple access (OFDMA) system in which a terminal performs packet communication in coverage of a base station, the base station transmits packet data to the terminal, information is collected necessary for scheduling, scheduling is performed using the collected information, an effective signal-to-noise ratio (SNR) corresponding to a transmission packet of a selected terminal is acquired for a unitary precoded orthogonal frequency division multiplexing (OFDM) and an OFDM, an effective SNR for the unitary precoded OFDM is compared with an effective SNR for the OFDM, a multiplexing scheme appropriate for the selected terminal is selected according to the comparison result, and packet data is transmitted using the selected multiplexing scheme.

According to a further aspect of exemplary embodiments of the present invention, there is provided an adaptive data multiplexing reception method in a terminal for an orthogonal frequency division multiple access (OFDMA) system in which a terminal performs packet communication in coverage of a base station, the base station transmits packet data to the terminal, a determination is made as to whether the terminal's packet data has been received, a multiplexing scheme used for the terminal's packet data is searched, if the terminal's packet data has been received, the packet data is demultiplexed using the searched multiplexing scheme.

According to yet another aspect of exemplary embodiments of the present invention, there is provided a base station apparatus for an orthogonal frequency division multiple access (OFDMA) system in which a terminal performs packet communication in coverage of a base station, the base station transmits packet data to the terminal through adaptive data multiplexing, a unitary transform unit performs unitary transformation on modulation symbols to be transmitted in a frequency domain, a switch unit switches to the unitary transform unit, and a controller determines whether to switch the switch unit according to a multiplexing scheme.

According to still another aspect of exemplary embodiments of the present invention, there is provided a terminal apparatus for an orthogonal frequency division multiple access (OFDMA) system in which a terminal performs packet communication in coverage of a base station, the base station transmits packet data to the terminal through adaptive data multiplexing, an inverse unitary transform unit performs inverse unitary transformation on received modulation symbols in a frequency domain, and a controller determines whether to enable the inverse unitary transform unit according to a multiplexing scheme.

According to still another aspect of exemplary embodiments of the present invention, there is provided an orthogonal frequency division multiple access (OFDMA) system in which a terminal performs packet communication in coverage of a base station; the base station transmits packet data to the terminal through adaptive data multiplexing, collects information necessary for scheduling, performs scheduling using the collected information, compares a code rate of data to be transmitted to a selected terminal with a predetermined threshold, selects a proper multiplexing scheme according to the comparison result, and transmits packet data using the selected multiplexing scheme; and the terminal determines whether its packet data has been received, if its packet data has been received, searches for a multiplexing scheme used for its own packet data, and demultiplexes the packet data using the searched multiplexing scheme.

According to still another aspect of exemplary embodiments of the present invention, there is provided an orthogonal frequency division multiple access (OFDMA) system in which a terminal performs packet communication in coverage of a base station; the base station transmits packet data to the terminal through adaptive data multiplexing, collects information necessary for scheduling, performs scheduling using the collected information, acquires an effective signal-to-noise ratio (SNR) corresponding to a transmission packet of a selected terminal for a unitary precoded orthogonal frequency division multiplexing (OFDM) and an OFDM, compares an effective SNR for the unitary precoded OFDM with an effective SNR for the OFDM, selects a multiplexing scheme appropriate for the selected terminal according to the comparison result, and transmits packet data using the selected multiplexing scheme; and the terminal determines whether its packet data has been received, if its packet data has been received, searches for a multiplexing scheme used for its own packet data, and demultiplexes the packet data using the searched multiplexing scheme.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 6:
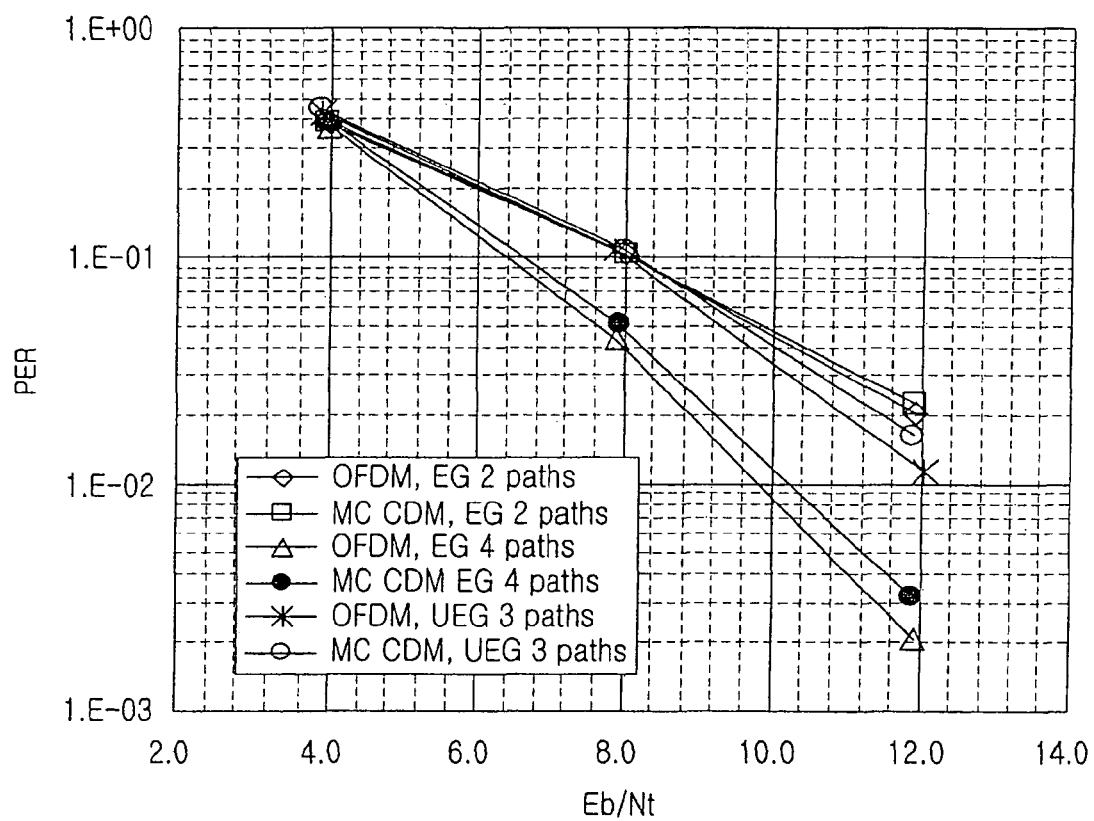
FIG. 6 is a diagram illustrating performance comparison results between OFDM and OFCDM for a code rate=1/2 of a transport block.
Figure 7:
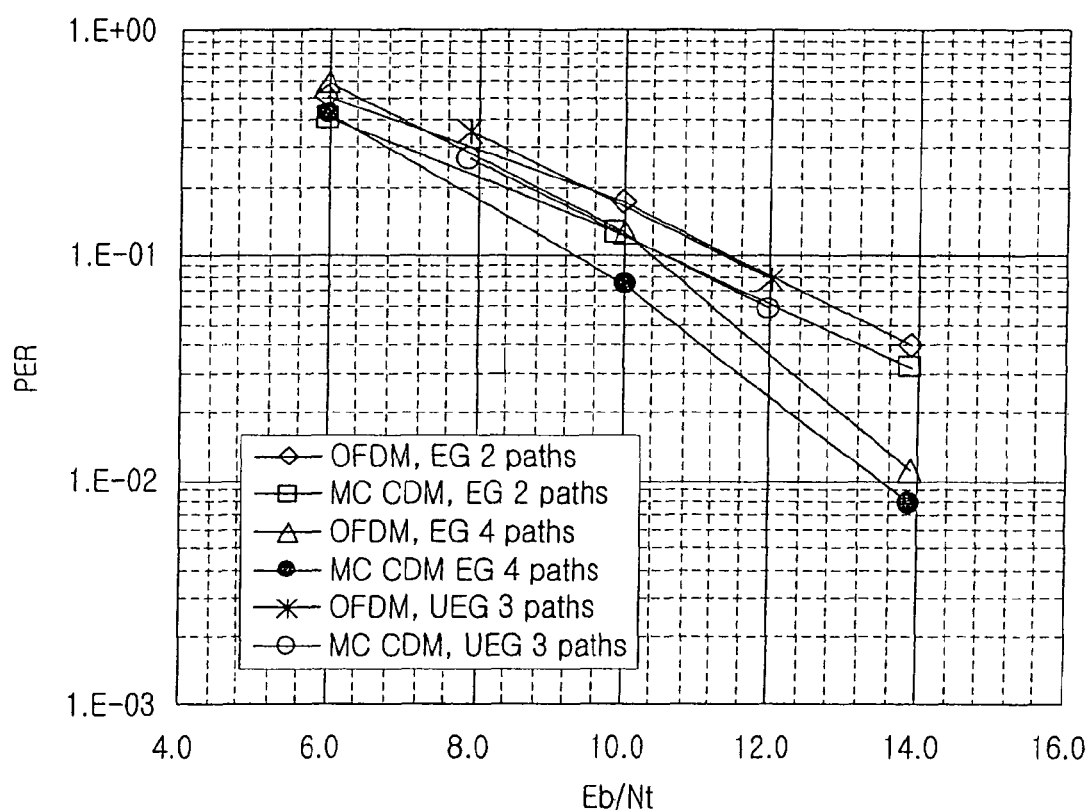
FIG. 7 is a diagram illustrating performance comparison results between OFDM and OFCDM for a code rate=4/5 of a transport block.

The broad term "Unitary Precoded OFDM" includes all of OFCDM, FFT-S-OFDM and FFH-OFDM. Although FIGS. 5 to 7 exhibit the comparison data between OFDM and OFCDM, all of OFCDM, FFT-S-OFDM and FFH-OFDM have the same characteristics. Therefore, it can be considered that FIGS. 5 to 7 are simulation data between OFDM and Unitary Precoded OFDM.

The relative performances of the foregoing two technologies, that is, OFDM and Unitary Precoded OFDM, are not constant, but variable according to several factors. The important factors of the several factors may include a code rate of a data transport block and a frequency selectivity of a channel. Therefore, with reference to FIGS. 5 to 7, a description will now be made of performance comparison results between OFDM and OFCDM in terms of the code rate and the channel frequency selectivity.

Figure 5:
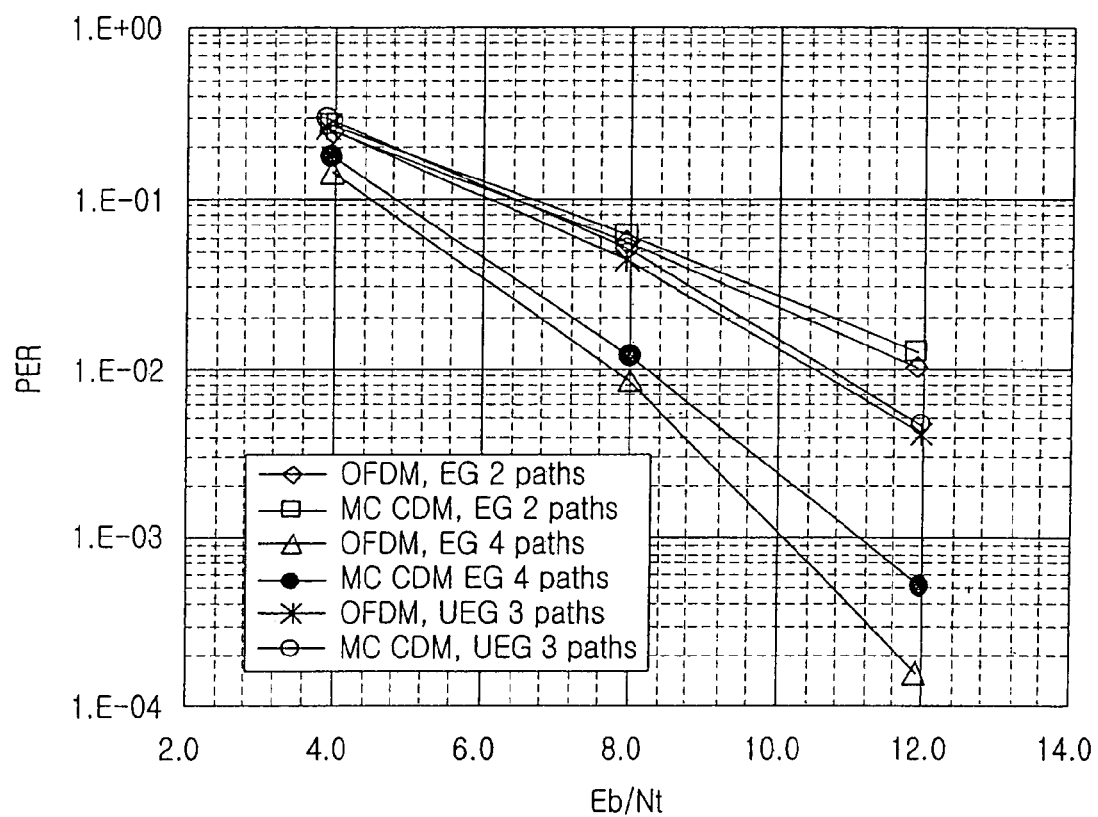
FIG. 5 is a diagram illustrating performance comparison results between OFDM and OFCDM for a code rate=1/4 of a transport block.

FIG. 5 is a diagram illustrating performance comparison results between OFDM and OFCDM (denoted by 'MC CDM' in FIGS. 5 to 7) for a code rate=1/4 of a transport block. In FIGS. 5 to 7, 'EG' denotes equal gain paths, and "UEG" denotes unequal gain paths. In the graphs, the X-axis represents bit energy/total noise (Eb/Nt), and the Y-axis represents a packet error rate (PER).

In FIG. 5, OFDM is superior in performance to OFCDM (MC CDM) at the code rate=1/4 of the transport block. Also, the performance difference level changes according to variations in frequency selectivity, that is, variations in the number of paths.

FIG. 6 is a diagram illustrating performance comparison results between OFDM and OFCDM for a code rate=1/2 of a transport block.

In FIG. 6, OFDM is superior in performance to OFCDM (MC CDM) at the code rate=1/2 of the transport block. Also, the performance difference level changes according to variations in frequency selectivity, that is, variations in the number of paths.

FIG. 7 is a diagram illustrating performance comparison results between OFDM and OFCDM for a code rate=4/5 of a transport block.

In FIG. 7, OFDM is superior in performance to OFCDM at the code rate=4/5 of the transport block. Also, the performance difference level changes according to variations in frequency selectivity, that is, variations in the number of paths.

Figure 8:
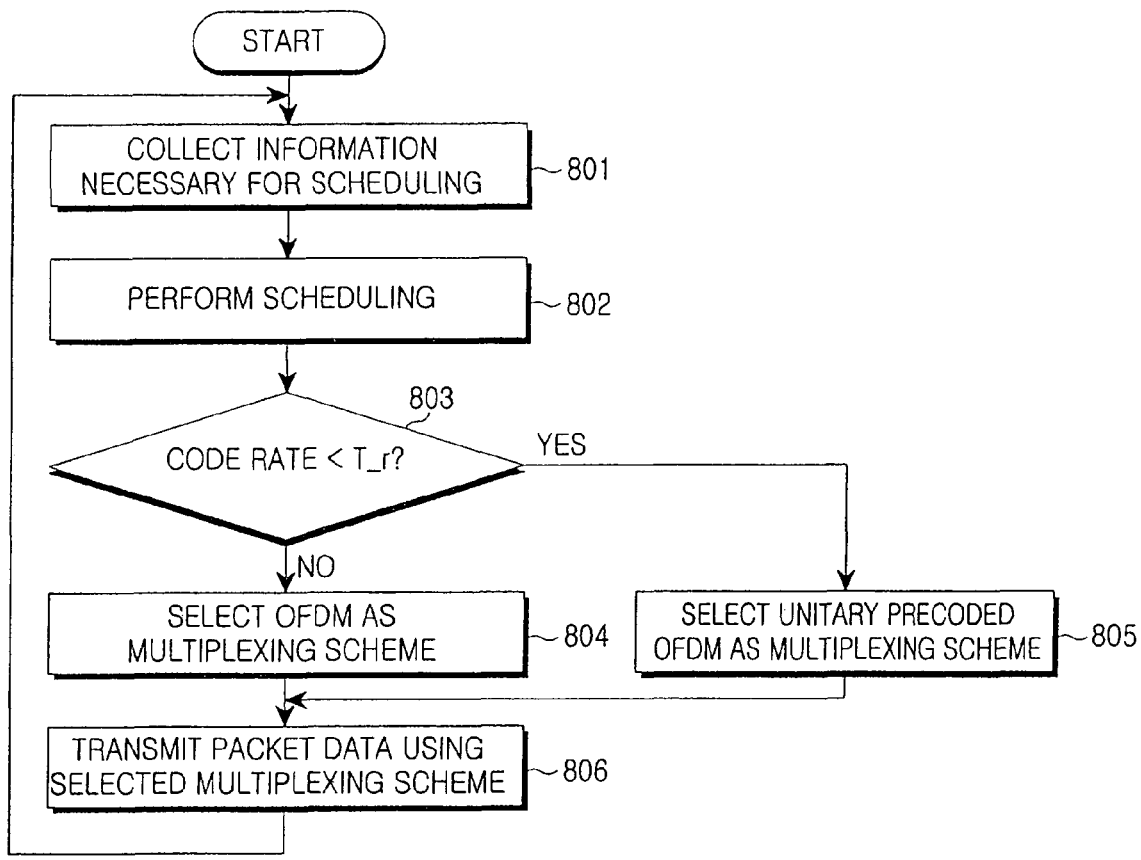
FIGS. 8 and 9 are diagrams illustrating a method in which a transmitter adaptively selects a multiplexing scheme based on a predetermined criterion each time it transmits a packet data channel, and transmits packets using the selected multiplexing scheme in an OFDM-based wireless communication system according to an exemplary embodiment of the present invention.
Figure 9:
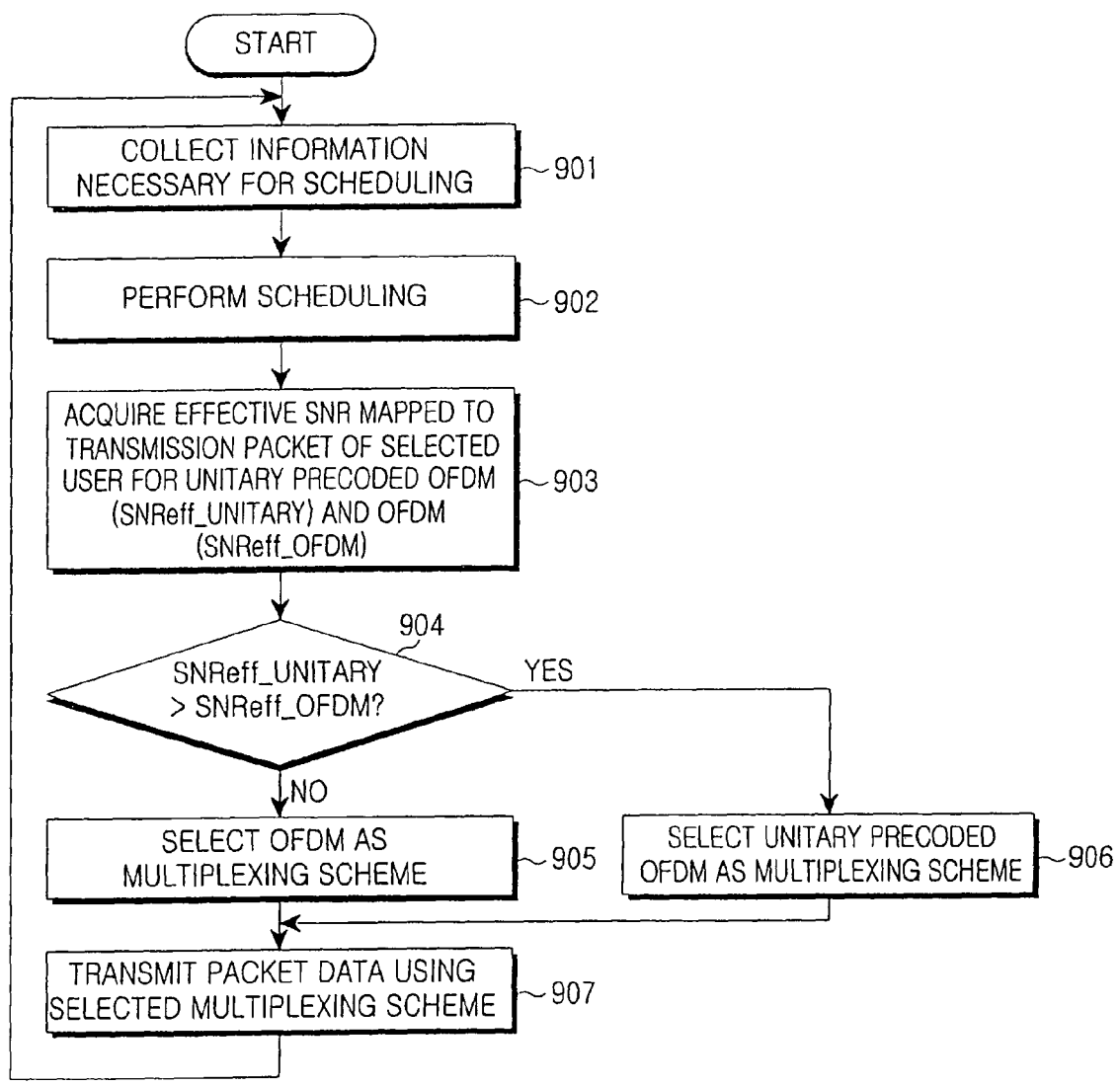

FIGS. 8 and 9 are diagrams illustrating a method in which a transmitter adaptively selects a multiplexing scheme based on a predetermined criterion each time it transmits a packet data channel, and transmits packets using the selected multiplexing scheme in an OFDM-based wireless communication system according to an exemplary embodiment of the present invention.

In other words, FIGS. 8 and 9 are diagrams illustrating a method for transmitting forward data from a base station to a terminal according to an exemplary embodiment of the present invention. The forward data transmission method can be divided into methods of FIGS. 8 and 9 according to the criterion base on which the base station adaptively selects a multiplexing scheme. The method of FIG. 8 will first be described below.

Referring to FIG. 8, in step 801, a scheduler of a packet transmitter collects information necessary for scheduling. The information necessary for scheduling can generally include a Quality-of-Service (QoS) level for each user's traffic, the current channel state of each user, and the amount of current transmission traffic for each user.

In step 802, the scheduler of the packet transmitter performs scheduling after collecting the information necessary for scheduling. In the scheduling process, the scheduler determines packet data of the user it will transmit at a data rate at a corresponding time. As to the selected user, either one or a plurality of users can be selected according to system conditions. Determining the data rate means determining how large an amount of data will be transmitted for how long time. In this process, the general mobile communication system determines a modulation order (for example, QPSK, 8PSK, 16QAM, and the like) and a code rate, together with the data rate of each individual user.

After the scheduling is determined, a multiplexing scheme to be used for transmission of packet data for the selected user is determined in steps 803 to 805. The operation in steps 803 to 805 can be considered as the core of an exemplary embodiment of the present invention. In step 803, the packet transmitter determines whether the code rate for the packet data, determined as a result of the scheduling, is higher or lower than a predetermined threshold T_r. The reason for selecting the multiplexing scheme according to the code rate is because performances of OFDM and Unitary Precoded OFDM are susceptible to the code rate, as shown in the simulation results of FIGS. 5 and 7. Therefore, certain exemplary embodiments of the present invention selects a multiplexing scheme based on the threshold for the code rate, previously determined in the packet transmitter.

If a determination is made in step 803 that the code rate is not higher than T_r, the packet transmitter determines OFDM as the multiplexing scheme in step 804. On the other hand, the packet transmitter determines Unitary Precoded OFDM as the multiplexing scheme in step 805. Thereafter, in step 806, the packet transmitter transmits packet data according to the multiplexing scheme determined in steps 803 to 805.

FIG. 9 is a diagram illustrating a process of adaptively determining a multiplexing scheme using another criterion different from that of FIG. 8 according to an exemplary embodiment of the present invention.

Referring to FIG. 9, in step 901, a scheduler of a packet transmitter collects information necessary for scheduling. The information necessary for scheduling can generally include a QoS level for each user's traffic, the current channel state of each user, and the amount of current transmission traffic for each user.

In step 902, the scheduler of the packet transmitter performs scheduling after collecting the information necessary for scheduling. In the scheduling process, the scheduler determines packet data of the user it will transmit at the data rate at a corresponding time. As to the selected user, at least one of the users can be selected according to system conditions. Determining the data rate means determining how large an amount of data will be transmitted for how long of time. In this process, the general mobile communication system determines a modulation order (for example, QPSK, 8PSK, 16QAM, and the like) and a code rate, together with the data rate of each individual user.

After the scheduling is determined, a multiplexing scheme to be used for transmission of packet data for the selected user is determined in steps 903 to 905. The operation in steps 903 to 905 can be considered as the core of the present invention. Another criterion, according to an exemplary embodiment of the present invention, for adaptively determining a multiplexing scheme includes an effective signal-to-noise ratio (SNR). That is, the proposed method determines whether OFDM is higher or lower than Unitary Precoded OFDM in terms of the effective SNR for the current channel of the selected user, and then selects a multiplexing scheme having the higher effective SNR.

An effective SNR for OFDM will be denoted by $SNR_{eff\_}OFDM$, and an effective SNR for Unitary Precoded OFDM will be denoted by $SNR_{eff\_}Unitary$. Generally, a wireless channel of each user can be measured in each terminal, so the terminal can be aware of the $SNR_{eff\_}OFDM$ and $SNR_{eff\_}Unitary$. Therefore, in order to allow a base station to be aware of the $SNR_{eff\_}OFDM$ and $SNR_{eff\_}Unitary$, there is a possible method in which each terminal feeds back both of the $SNR_{eff\_}OFDM$ and $SNR_{eff\_}Unitary$ to the base station. There is another possible method in which each terminal feeds back one of the $SNR_{eff\_}OFDM$ and $SNR_{eff\_}Unitary$ to the base station, together with information on its preferred multiplexing scheme.

Step 903 corresponds to a process in which a base station obtains $SNR_{eff\_}OFDM$ and $SNR_{eff\_}Unitary$ for each terminal in the above described method. A general method used for calculating $SNR_{eff\_}OFDM$ and $SNR_{eff\_}Unitary$ will now be introduced below, by way of example.

$$SNR_{eff\_}Unitary = \frac{\lambda_T^2}{N\lambda_T - \lambda_T^2}, \quad (1)$$

$$\text{where } \lambda_T = \sum_{k=1}^{N} \lambda_k = \sum_{k=1}^{N} \frac{\gamma_0 \cdot |g_k|^2}{\gamma_0 \cdot |g_k|^2 + 1}$$

$$\text{and } \gamma_0 \cdot |g_k|^2 = SNR \text{ of } k-th \text{ sub-carrier}$$

Equation (1) represents a general method for finding $SNR_{eff\_Unitary}$.

$$SNR_{eff\_OFDM} = C^{-1}(R_{sum}), \quad (2)$$

$$\text{where } R_{sum} = \frac{1}{N_{data}} \sum_{n,k} C(SNR[k])$$

Equation (2) represents a general method for finding $SNR_{eff\_OFDM}$. In Equation (2), Ndata denotes the number of sub-carriers used for transmitting data within one OFDM symbol, SNR[k] denotes an SNR of each sub-carrier, and C(SNR[k]) denotes an AWGN capacity formula, and $C^{-1}(R_{sum})$ indicates an inverse function of C(SNR[k]).

$$SNR_{eff} = -\beta \ln\left(\frac{1}{N_u} \sum_{k=1}^{N_u} e^{-\frac{\gamma_k}{\beta}}\right) \quad (3)$$

Equation (3) represents another general method for finding $SNR_{eff\_OFDM}$. In Equation (3), β is a constant, Nu denotes the total number of sub-carriers, and γk denotes an SNR of a sub-carrier #k. In step 904, the packet transmitter obtains the $SNR_{eff\_OFDM}$ and the $SNR_{eff\_Unitary}$ and compares levels of the $SNR_{eff\_OFDM}$ and the $SNR_{eff\_Unitary}$.

If a determination is made in step 904 that the $SNR_{eff\_Unitary}$ is higher than the $SNR_{eff\_OFDM}$, the packet transmitter selects Unitary Precoded OFDM as the multiplexing scheme in step 906. Otherwise, the packet transmitter selects OFDM as the multiplexing scheme in step 905. Thereafter, in step 907, the packet transmitter transmits packet data according to the selected multiplexing scheme.

Figure 10:
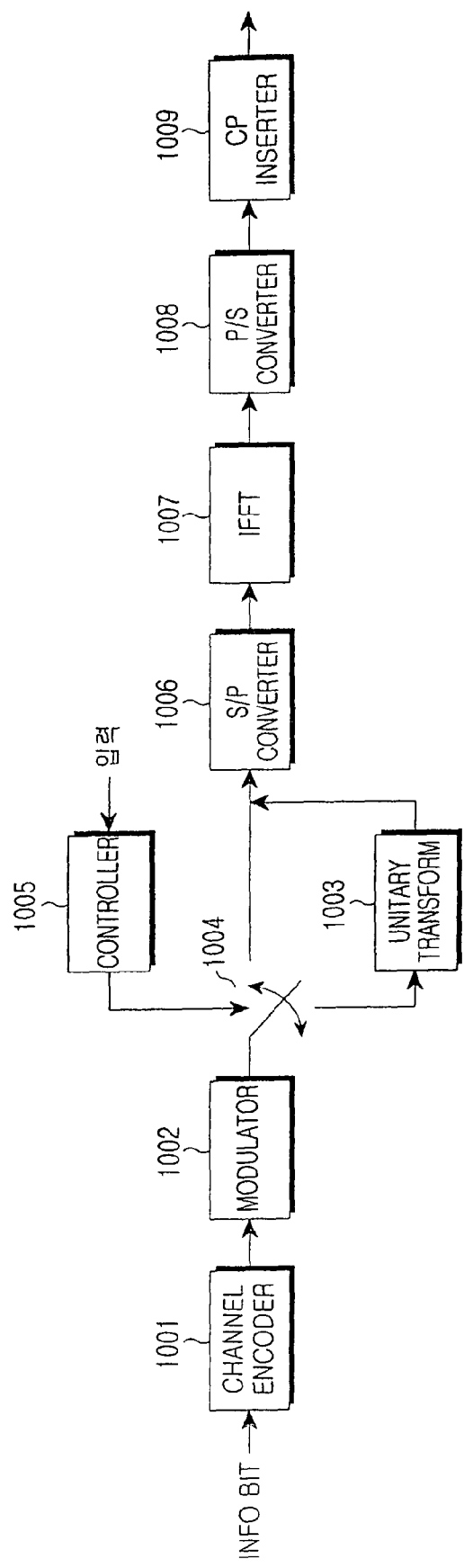
FIG. 10 is a diagram illustrating a structure of a transmitter based on the adaptive multiplexing method of FIG. 8 or 9 according to an exemplary embodiment of the present invention.

FIG. 10 is a diagram illustrating a structure of a transmitter based on the adaptive multiplexing method of FIG. 8 or 9 according to an exemplary embodiment of the present invention.

Referring to FIG. 10, the adaptive multiplexing method-based transmitter includes a channel encoder 1001, modulator 1002, unitary transform unit 1003, switch unit 1004, controller 1005, S/P converter 1006, IFFT unit 1007, P/S converter 1008 and CP inserter 1009.

The channel encoder 1001 performs channel encoding on an input information bit stream. Generally, a convolutional encoder, turbo encoder, or LDPC encoder is used as the channel encoder 1001. The modulator 1002 performs QPSK, 8PSK, or 16QAM modulation on the output of the channel encoder 1001. Although not illustrated in FIG. 10, it would be obvious to those skilled in the art that a rate matching unit for performing repetition and puncturing functions can be added between the elements 1001 and 1002.

Figure 1:
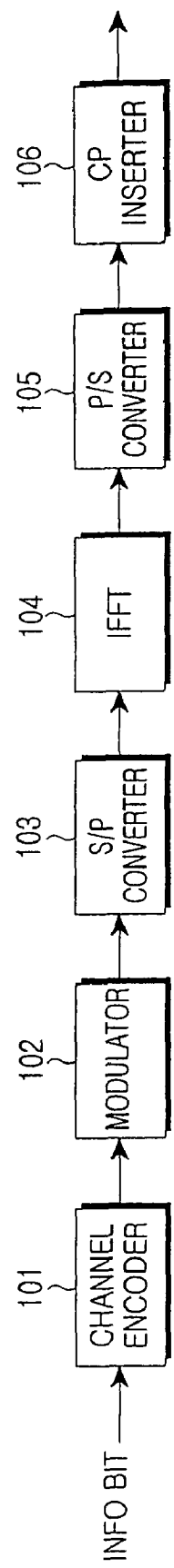
FIG. 1 is a block diagram illustrating a structure of a transmitter for a general OFDM system.
Figure 2:
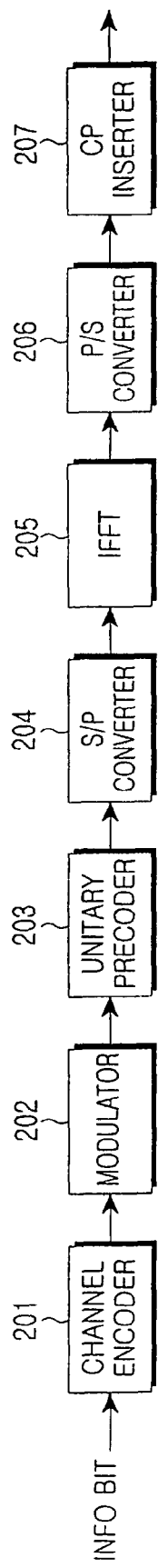
FIG. 2 is a block diagram illustrating a structure of a general Unitary Precoded OFDM transmitter.

The switch unit 1004, under the control of the controller 1005, performs switching to use one of OFDM and Unitary Precoded OFDM as a multiplexing scheme. The controller 1005 controls the switch unit 1004 in the process of FIG. 8 or 9. If the switch unit 1004 is switched to the unitary transform unit 1003 under the control of the controller 1005, a unitary precoder is enabled. That is, data is transmitted by OFCDM, FFT-S-OFDM or FFH-OFDM described with reference to FIG. 2.

Figure 3A:
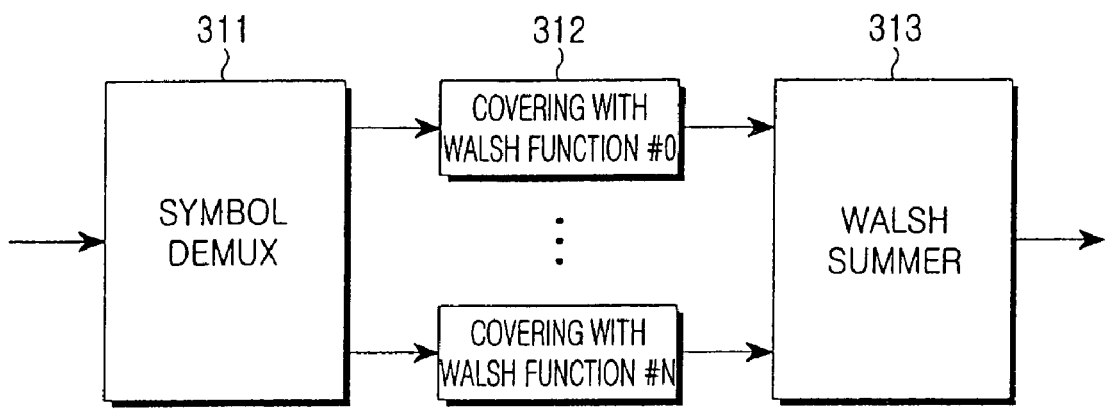
FIG. 3A is a diagram illustrating a unitary precoder in which Hadamard transform is used.
Figure 3B:
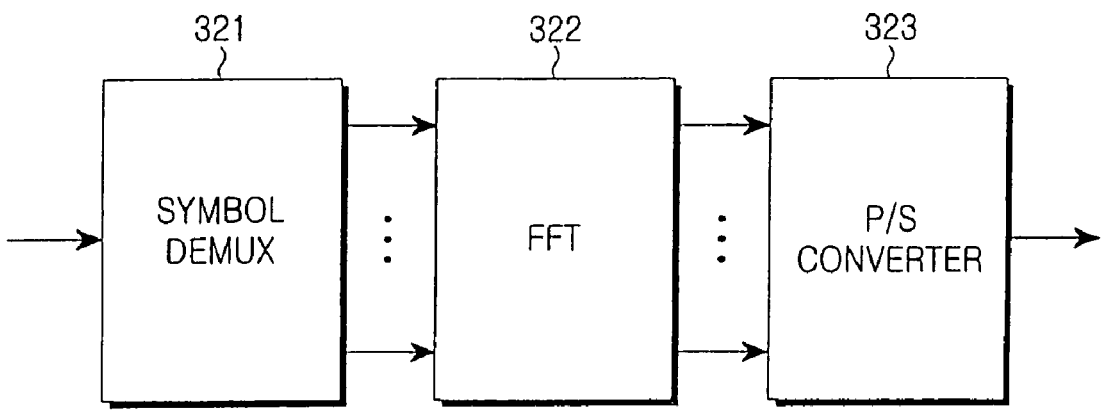
FIG. 3B is a diagram illustrating a unitary precoder in which Fast Fourier Transform (FFT) is used.
Figure 3C:
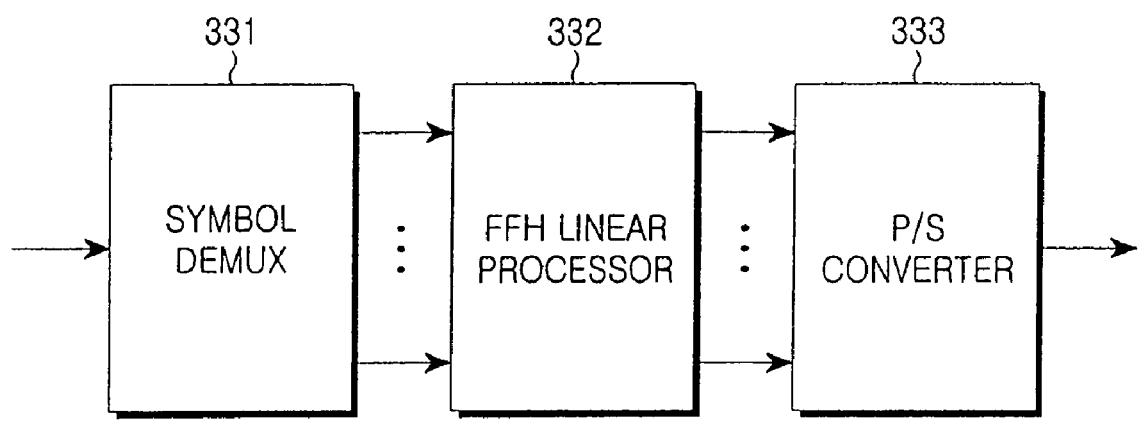
FIG. 3C is a diagram illustrating a unitary precoder in which Fast Frequency Hopping (FFH) is used.
Figure 4:
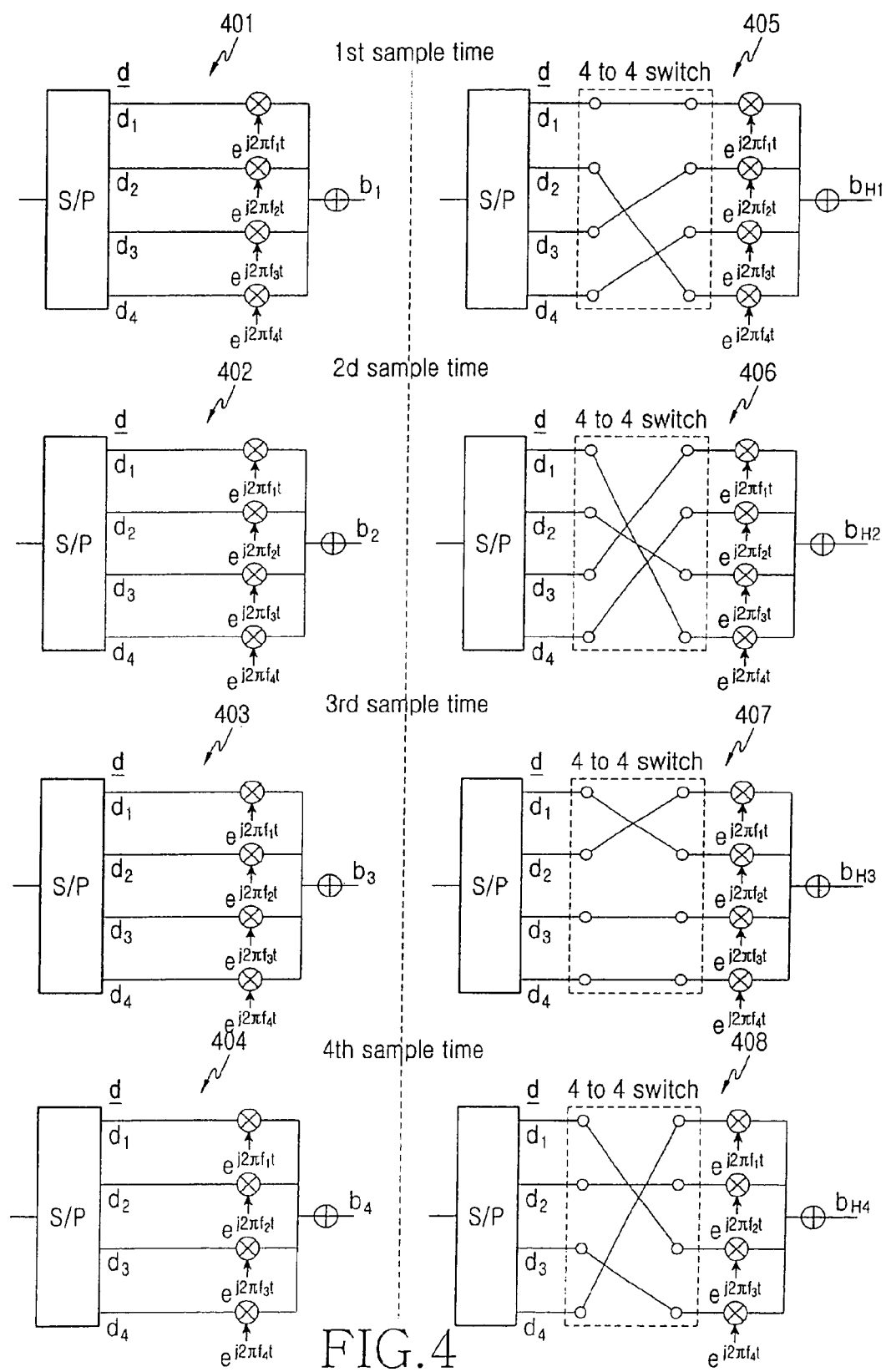
FIG. 4 is a diagram for a brief description of a concept of the general FFH introduced in FIG. 3A.

The unitary transform unit 1003 is equal in structure and operation to any one of the unitary precoders shown in FIGS. 3A to 3C. If the switch unit 1004 is switched to the S/P converter 1006 under the control of the controller 1005, the transmitter does not enable the unitary transform unit 1003.

The S/P converter 1006 has a function for converting a serial input signal into a parallel signal. The IFFT unit 1007 performs IFFT calculation on the output of the S/P converter 1006. The P/S converter 1008 converts the parallel output of the IFFT unit 1007 into a serial signal. The CP inserter 1009 has a function for attaching a CP to the output signal of the P/S converter 1008.

Although not illustrated in FIG. 10, a size of a matrix corresponding to the unitary transform unit 1003 is variable according to a given size of the output of the S/P converter 1006. In addition, as the size of the matrix is variable, a plurality of unitary precoders can be used. However, the transmitter should not necessarily include a plurality of unitary precoders, but may perform iterative calculation with one unitary precoder.

For example, if a size of the output of the S/P converter 1006 is 16 (meaning that the number of sub-carriers allocated to the transmitter is 16), it means that a size of an input to the S/P converter 1006 is 16. Herein, a size-16 precoder matrix, two size-8 precoder matrixes (or two calculations with one size-8 precoder matrix), four size-4 precoder matrixes (or four calculations with one size-4 precoder matrix), or eighth size-2 precoder matrixes (or eight calculations with one size-2 precoder matrix) can be used for the unitary transform unit 1003.

Meanwhile, certain exemplary embodiments of the present invention should not necessarily be restricted to the forward transmission. The proposed method can also be applied to reverse transmission, that is, data transmission from the terminal to the base station. However, in most systems, because the operation subject of the scheduling is the base station, the terminal, after directly performing the scheduling in the way of FIG. 8 or 9, receives scheduling information from the base station for the reverse transmission, instead of using the adaptive multiplexing method. Thereafter, the transmitter, in a slightly different way, adaptively selects a multiplexing scheme according to the same criterion as that described above, at an allowed time where the transmitter transmits data.

Figure 11:
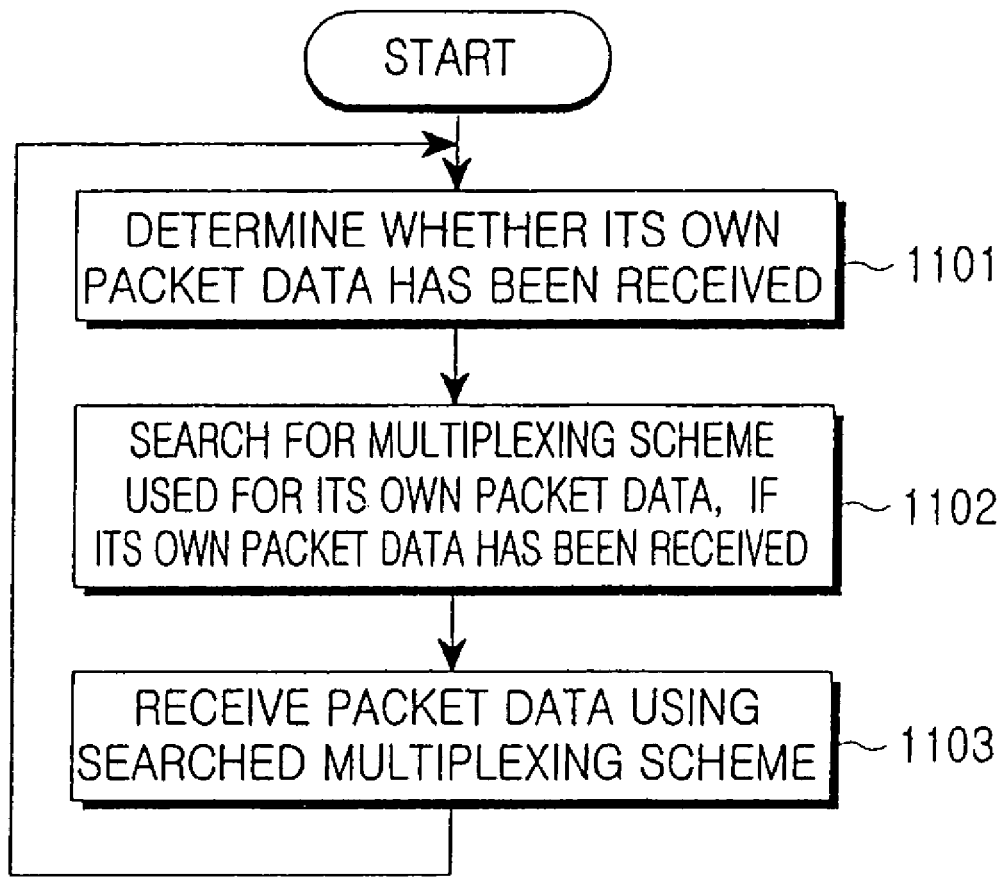
FIG. 11 is a diagram illustrating a method in which a receiver receives packets using the proposed adaptive multiplexing method according to an exemplary embodiment of the present invention.

FIG. 11 is a diagram illustrating a method in which a receiver receives packets using the proposed adaptive multiplexing method according to an exemplary embodiment of the present invention.

Although the method of FIG. 11 will be described with reference to forward packet transmission from the base station to the terminal, the method can also be applied to reverse packet transmission.

Referring to FIG. 11, in step 1101, a terminal continuously determines whether its own packet has been received. The operation in step 1101 is equal to the corresponding operation in the common packet data system. That is, in this process, the terminal continuously monitors a packet data control channel transmitted in the forward direction and determines whether there is any packet allocated to the terminal itself.

If a determination is made in step 1101 that the terminal's own packet has been received, the terminal performs a process of receiving a packet data channel in step 1102. At this moment, the terminal should search for the multiplexing scheme (one of OFDM and Unitary Precoded OFDM) used for the packet transmission.

To achieve the operation of step 1102, there are two possible methods. In a first possible method, the base station provides information indicating the used multiplexing scheme to the terminal through a packet data control channel.

In another possible method, the multiplexing schemes used, centering on a specific code rate, are predefined between the transmission and the receiver. In an exemplary implementation, the receiver, once it is aware of the code rate, can determine which multiplexing scheme the transmitter has used in transmitting the packet. For example, it is predefined that OFDM is used at a code rate lower than or equal to a 1/2 code rate, and OFCDM is used at a code rate higher than the 1/2 code rate.

In step 1103, the terminal demodulates the packet data channel transmitted thereto according to the multiplexing scheme found in step 1102.

Figure 12:
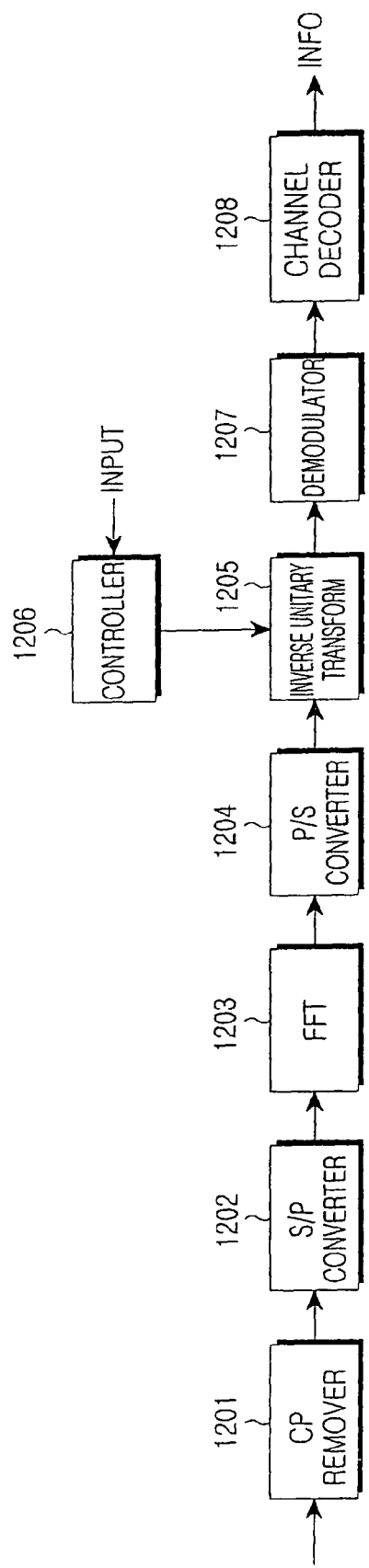
FIG. 12 is a diagram illustrating a structure of a receiver according to an exemplary embodiment of the present invention.

FIG. 12 is a diagram illustrating a structure of a receiver according to an exemplary embodiment of the present invention.

Referring to FIG. 12, the receiver includes a CP remover 1201, S/P converter 1202, Fast Fourier Transform (FFT) unit 1203, P/S converter 1204, inverse unitary transform unit 1205, controller 1206, demodulator 1207, and channel decoder 1208.

The CP remover 1201 removes a CP from a received signal. The S/P converter 1202 converts the CP-removed received signal into a parallel signal, and outputs the parallel signal to the FFT unit 1203. The P/S converter 1204 converts the output of the FFT unit 1203 into a serial signal. The inverse unitary transform unit 1205 is a block for performing inverse unitary transform. The inverse unitary transform unit 1205, under the control of the controller 1206, determines whether to enable or disable an inverse unitary transformer. The output of the inverse unitary transform unit 1205 is input to the demodulator 1207, and the output of the demodulator 1207 is input to the channel decoder 1208. The channel decoder 1208 obtains final information through a channel decoding process.

Although not illustrated in FIG. 12, in a similar method to that in FIG. 10, a size of a matrix corresponding to the inverse unitary transform unit 1205 is variable according to a given size of the output of the P/S converter 1204, and as the size of the matrix is variable, a plurality of unitary precoders can be used. However, the receiver should not necessarily include a plurality of unitary precoders, but may perform iterative calculation with one unitary precoder. For example, if it is assumed that a size of the output of the P/S converter 1204 is 16, a size-16 precoder matrix, two size-8 precoder matrixes (or two calculations with one size-8 precoder matrix), four size-4 precoder matrixes (or four calculations with one size-4 precoder matrix), or eighth size-2 precoder matrixes (or eight calculations with one size-2 precoder matrix) can be used for the inverse unitary transform unit 1205.

The adaptive multiplexing method proposed in the present invention can also be used in a system employing Hybrid Automatic Repeat reQuest (HARQ). Generally, in a packet transmission process in the system employing HARQ, in many cases, a code rate is high for initial transmission. Therefore, if the receiver uses OFDM for Unitary Precoded OFDM based HARQ during initial transmission according to the proposed rule, it can efficiently increase reception performance. In addition, the rule for determining the multiplexing can be used by adaptively changing the multiplexing scheme in initial transmission and retransmission according to an effective SNR instead of the code rate.

For simplification of the HARQ operation, there is a possible method in which once a multiplexing scheme is determined based on the code rate or the effective SNR at initial transmission, the same multiplexing scheme as the scheme determined at the initial transmission can be used for retransmission. It would be obvious to those skilled in the art that as described above, the adaptive multiplexing method proposed in an exemplary embodiment of the present invention can be used for HARQ, and the multiplexing scheme can be determined even for other purposes using a selected one of the two criteria, that is, code rate and effective SNR, contributing to an increase in reception performance of the transmitted packets.

As can be understood from the foregoing description, in the communication system using an OFDM-based multiple access scheme, certain exemplary embodiments of the present invention can improve reception performance of the transmitted wireless packet data using the adaptive multiplexing method.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An adaptive data multiplexing transmission method in a base station for an orthogonal frequency division multiple access (OFDMA) system in which a terminal performs packet communication in coverage of a base station, and the base station transmits packet data to the terminal, the method comprising:

collecting information necessary for scheduling; performing scheduling using the collected information;

comparing code rate of data to be transmitted at least one terminal determined according to the scheduling result with a threshold;

selecting a proper multiplexing scheme according to the comparison result;

wherein the multiplexing scheme comprises a selected unitary precoded orthogonal frequency division multiplexing (OFDM), if the code rate of the data is lower than the threshold, and an OFDM, if the code rate of the data is higher than the threshold; and transmitting packet data using the selected multiplexing scheme.

2. An adaptive data multiplexing transmission method in a base station for an orthogonal frequency division multiple access (OFDMA) system in which a terminal performs packet communication in coverage of a base station, and the base station transmits packet data to the terminal, the method comprising:

collecting information necessary for scheduling;

performing scheduling using the collected information;

acquiring an effective signal-to-noise ratio (SNR) corresponding to a transmission packet of at least one selected terminal according to the scheduling result, for a unitary precoded orthogonal frequency division multiplexing (OFDM) and an OFDM;

comparing an effective SNR for the unitary precoded OFDM with an effective SNR for the OFDM;

selecting a multiplexing scheme appropriate for the selected terminal according to the comparison result;

wherein the multiplexing scheme comprises a selected unitary precoded OFDM, if the effective SNR for the unitary precoded OFDM is higher than the effective SNR for the OFDM, and the OFDM, if the effective SNR for the unitary precoded OFDM is lower than the effective SNR for the OFDM; and transmitting packet data using the selected multiplexing scheme.

3. An adaptive data multiplexing reception method in a terminal for an orthogonal frequency division multiple access (OFDMA) system in which a terminal performs packet communication in coverage of a base station, and the base station transmits packet data to the terminal, the method comprising:

determining whether terminal's packet data has been received;

if the terminal's packet data has been received, searching for a multiplexing scheme used for the terminal's packet data;

demultiplexing the packet data using the searched multiplexing scheme, wherein the multiplexing scheme is selected on the basis of comparison result between a code rate of data to be transmitted to the terminal and a threshold, or comparison result between an effective SNR for a unitary precoded OFDM and an effective SNR for an OFDM in the base station, and wherein the multiplexing scheme comprises at least one of a unitary precoded orthogonal frequency division multiplexing (OFDM) and an OFDM.

4. A base station apparatus for an orthogonal frequency division multiple access (OFDMA) system in which a terminal performs packet communication in coverage of a base station, and the base station transmits packet data to the terminal through adaptive data multiplexing, the apparatus comprising:

a unitary transform unit for performing unitary transformation on modulation symbols to be transmitted in a frequency domain;

a switch unit for switching to the unitary transform unit;

a controller for comparing code rate of data to be transmitted to at least one selected terminal with a threshold or an effective signal-to-noise ratio (SNR) for a unitary precoded orthogonal frequency division multiplexing (OFDM) of the selected terminal with an effective SRN for an OFDM, selecting a multiplexing scheme appropriate for the selected terminal according to the comparison result, determining whether to switch the switch unit according to the selected multiplexing scheme; and wherein the multiplexing scheme comprises at least one of a unitary precoded OFDM and an OFDM.

5. A terminal apparatus for an orthogonal frequency division multiple access (OFDMA) system in which a terminal performs packet communication in coverage of a base station, and the base station transmits packet data to the terminal through adaptive data multiplexing, the apparatus comprising:

an inverse unitary transform unit for performing inverse unitary transformation on received modulation symbols in a frequency domain;

a controller for determining if packet data of the terminal has been received, searching for a multiplexing scheme used for the packet data if the packet data was received, and determining whether to enable the inverse unitary transform unit according to the selected multiplexing scheme, wherein the multiplexing scheme is selected on the basis of comparison result between a code rate of data to be transmitted to the terminal and a threshold, or comparison result between an effective SNR for a unitary precoded OFDM and an effective SNR for an OFDM in the base station; and wherein the multiplexing scheme comprises at least one of a unitary precoded orthogonal frequency division multiplexing (OFDM) and an OFDM.

6. An orthogonal frequency division multiple access (OFDMA) system comprising:

a base station for collecting information necessary for scheduling, performing scheduling using the collected information, comparing a code rate of data to be transmitted to at least one terminal determined according to the scheduling result with a threshold, selecting a proper multiplexing scheme according to the comparison result, and transmitting packet data using the selected multiplexing scheme;

a terminal for performing packet communication in coverage of the base station, wherein the base station transmits packet data to the terminal through adaptive data multiplexing, determining whether its packet data has been received, searching for a multiplexing scheme used for its packet data, if its packet data has been received, and demultiplexing the packet data using the searched multiplexing scheme, and wherein the multiplexing scheme comprises at least one of a selected unitary precoded orthogonal frequency division multiplexing (OFDM), if the code rate of the data is lower than the threshold, and an OFDM, if the code rate of the data is higher than the threshold.

7. An orthogonal frequency division multiple access (OFDMA) system comprising:

a base station for collecting information necessary for scheduling, performing scheduling using the collected information, acquiring an effective signal-to-noise ratio (SNR) corresponding to a transmission packet at least one terminal determined according to the scheduling result, for each of unitary precoded orthogonal frequency division multiplexing (OFDM) and OFDM, comparing an effective SNR for the unitary precoded OFDM with an effective SNR for the OFDM, selecting a multiplexing scheme appropriate for the terminal according to the comparison result, and transmitting packet data using the selected multiplexing scheme;

a terminal for performing packet communication in coverage of the base station, wherein the base station transmits packet data to the terminal through adaptive data multiplexing, determining whether its packet data has been received, searching for a multiplexing scheme used for its packet data, if its packet data has been received, and demultiplexing the packet data using the searched multiplexing scheme, and wherein the multiplexing scheme comprises at least one of a selected unitary precoded OFDM, if the effective SNR for the unitary precoded OFDM is higher than the effective SNR for the OFDM, and the OFDM, if the effective SNR for the unitary precoded OFDM is lower than the effective SNR for the OFDM.

* * * * *